United States Patent Office 3,016,669
Patented Jan. 16, 1962

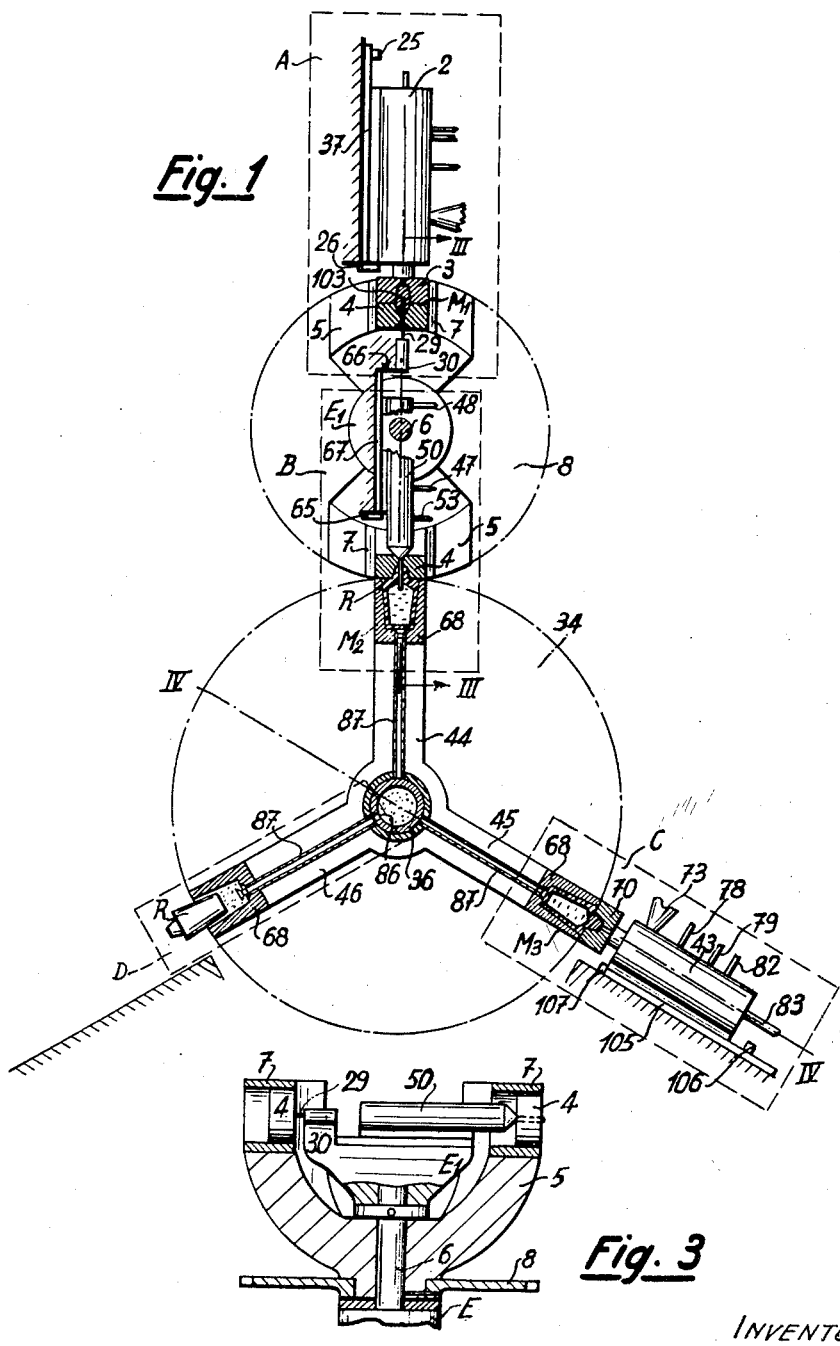

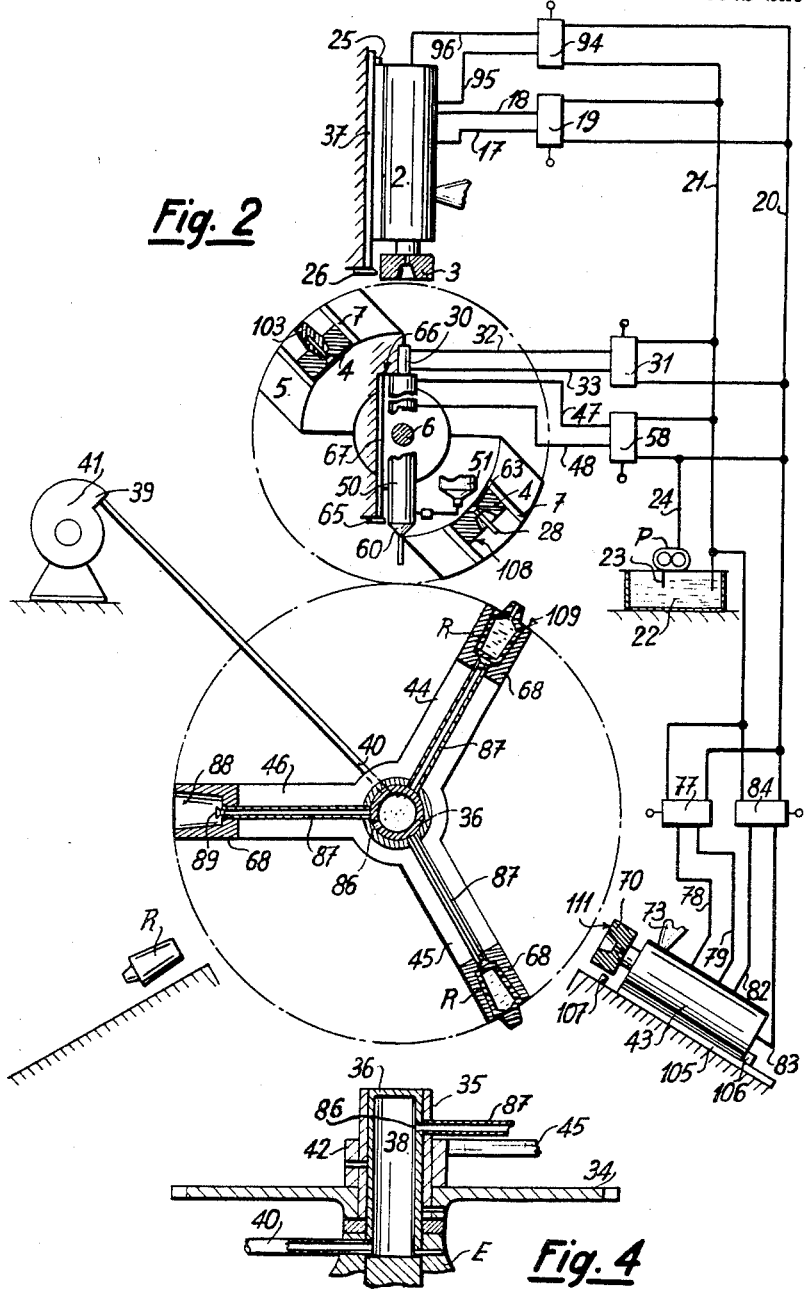

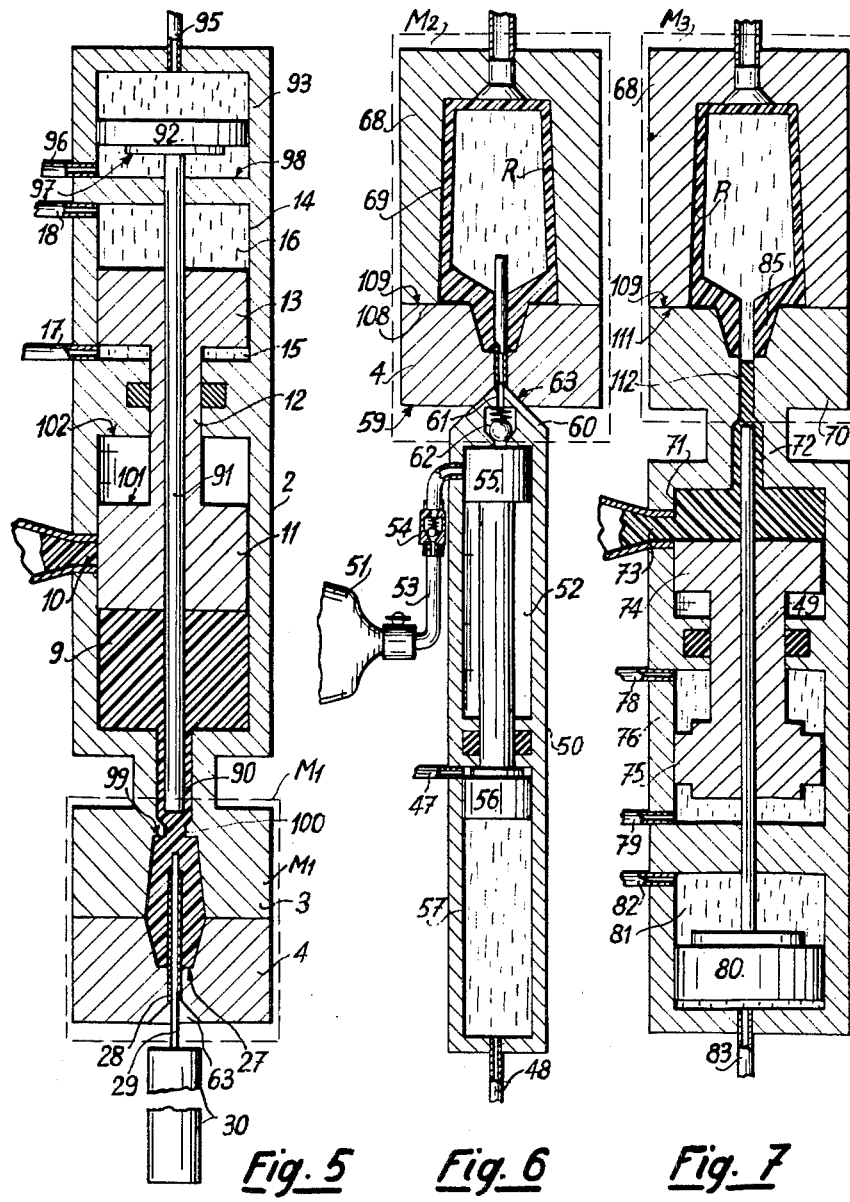

3,016,669
MANUFACTURING PROCESS OF A CONTAINER MADE OF PLASTIC MATERIAL AND INSTALLATION FOR CARRYING OUT SAID PROCESS
René Grosclaude, Geneva, Switzerland, assignor to Laboratoires Vifor S.A., Geneva, Switzerland, a corporation of Switzerland
Filed July 22, 1959, Ser. No. 828,774
Claims priority, application Switzerland Aug. 13, 1958
9 Claims. (Cl. 53—191)

The present invention has for its object a manufacturing process of a container made of plastic material which is characterized by forming said container by injecting into a plastic material, being in a state allowing its forming and placed in a mould, and at least semi-fluid product intended to be enclosed within said container and thereby forming simultaneously said container and filling it up by one and the same operation.

The invention has also for its object an installation for carrying out said process and which is characterized by the fact that it comprises an operation station for the formation of the container and filling the container which comprises a filling device by injection of a semi-fluid product intended for filling said container and means for injecting said product into a plastic material which is undergoing a state of formation and then the container is placed in a mould of which the shape and the volume of its cavity correspond to the form and the volume of the completed container.

The accompanying drawings illustrate schematically and by way of example an embodiment of an installation for carrying out the process and intended more particularly for the manufacturing and the filling of pharmaceutic phials.

FIG. 1 is a schematic top view of said installation in which only the members and elements necessary for an understanding of the process are illustrated in a working position.

FIG. 2 is a view similar to FIG. 1, the members and elements being shown in the positions which they occupy during a transfer operation. Furthermore, in said figure are shown the hydraulic connections connecting the various devices of the installation.

FIG. 3 is a partial cross-section along the line III—III of FIG. 1.

FIG. 4 is a partial cross-section along the line IV—IV of FIG. 1.

FIGS. 5 to 7 are cross-sections and at a greater scale of the various parts of the installation.

In the illustrated embodiment, the installations for carrying out the process comprises the following operation stations:

(1) a station A of formation of a mass of plastic material, the volume of which corresponds to the volume of the material required for the formation of the desired container.

(2) a station B of formation of said container by means of a semi-fluid product, intended for filling said container and to be enclosed within said container.

(3) a station C for sealing of the formed and filled container.

(4) a station D of ejection of the filled and sealed container.

The station A comprises an injection device 2 (shown more in detail in FIG. 5) of plastic material into a mould $M_1$ formed of two portions 3 and 4 of which the one 3 is carried by said injection device 2, while the second slides in a radial guide 7 carried by a support 5 mounted on a shaft 6. Said shaft 6 is rigidly secured in a frame E (FIG. 3) and the support 5 carries further a gear 8. Said support can occupy two working positions located at 180° one from another and defined by a locking device (not shown) of known type, such as a pin submitted to the action of a spring and the end of which engages impressions.

The injection device 2 comprises an injection cylinder 9 (FIG. 5) supplied with plastic material by a duct 10 and in which slides an injection piston 11 the shank 12 of which carries a piston 13 which slides in a cylinder 14 and delimits two chambers of variable volume 15 and 16 connected by ducts 17 and 18 as well as by a distributor 19 to a piping 20 of fluid under pressure and to an exhaust piping 21. Said piping 20 is supplied with fluid under pressure by a pump P the suction piping 23 of which dips into a tank 22, while its delivery piping 24 is connected to the piping 20.

The injection cylinder 9 is connected by a duct 90 to the cavity of the portion 3 of the mould $M_1$ rigidly secured to the front end of the injection device 2.

Through the axis of pistons 11 and 13 passes a push rod 91 carried by a piston 92 which slides in a cylinder 93 of a double-acting servo-motor. The two chambers of cylinder 93 are of variable volume and are connected through a distributor 94 and pipings 95 and 96 alternately to the piping 20 of fluid under pressure and to the exhaust piping 21.

The injection device 2 is movable between two abutments 25, 26 along rails 37 carried by said fixed frame E and disposed in a radial plane passing through the shaft 6.

The portion 4 of the mould carried by said support 5 comprises, rigidly fixed on its bottom 27, a filling duct 28. Said duct is closed during the injection of plastic material into the mould $M_1$ by a needle 29 carried by the piston of a hydraulic servo-motor 30 rigidly secured on an auxiliary frame $E_1$ carried by said fixed shaft 6. Said servo-motor is connected through a distributor 31 and pipings 32, 33, on the one hand, to said piping 20 of fluid under pressure and, on the other hand, to said exhaust piping 21.

As shown in the drawings, the support 5 carries two mould portions 4 situated on both sides of said shaft 6 in a same diametral plane of said support 5, and each mould portion 4 slides along a radial guide 7.

The gear 8 meshes with a toothed wheel 34 rigidly secured on a sleeve 35 (FIG. 4) parallel to said shaft 6 and rotating freely round a hollow shaft 36 tightly closed at its both ends and rigidly secured in said frame E at one of its ends. The inner cavity of said hollow shaft 36 is connected through a piping 40 to the delivery pipe 39 of an air compressor 41.

The toothed wheel 34 is secured on said sleeve 35 by the intermediary of a hub 42 keyed on said sleeve and which carries three radial arms 44, 45, 46 symmetrically disposed round said shaft 36.

The station B of formation and filling of the desired container comprises a filling device 50 by injection of a liquid coming from a tank 51 (FIG. 6). Said filling device comprises a cylinder 52 supplied with filling liquid by the tank 51 and by the intermediary of a feeding piping 53 provided with a retaining valve 54. An injection piston 55 slides in said cylinder 52 and is actuated by a hydraulic servo-motor the piston 56 of which delimits inside a cylinder 57 having two chambers of variable volume connected through a distributor 58 and pipings 47 and 48, on the one hand, to said piping 20 of fluid under pressure, and, on the other hand, to said exhaust piping 21.

The front end of the injection cylinder 52 carries a conical nose 60 through which passes a duct 61 provided with a retaining valve 62. Said conical nose 60 fits tightly in a corresponding conical inlet 63 in the external surface 59 of the wall forming the buttom of the mould portion 4.

The filling device 50 is movable between two abutments 65 and 66 along rails 67 secured on said auxiliary frame $E_1$, in a diametral plane passing through said shaft 6 and in the prolongation of the rails 37 which carry the injection device 2 of plastic material.

When the filling device 50 is in working position (position illustrated on FIG. 1), defined by the abutment 65, its conical nose 60 engages the conical inlet 63 and pushes the mould portion 4 onto a third mould portion 68 so as to form with said portion a mould $M_2$ the cavity 69 of which presents the form and the volume of the desired container. Each arm 44, 45, 46 carries such a third mould portion 68 and the driving ratio between the gear 8 and the toothed wheel 34 is equal to 3/2 so that the gear 8 executes half a revolution when the toothed wheel executes a third of a revolution.

The station C for sealing of the formed and filled container R, comprises a fourth mould portion 70 fitting on the third mould portion 68 so as to form a mould $M_3$. Said portion 70 is carried by the front portion of a sealing device 43 movable along rails 105 between two abutments 106 and 107. Said rails 105 are disposed in a radial plane passing through the hollow shaft 36 and located at 120° of the radial plane connecting the two shafts 6 and 36.

Said sealing device comprises:

(a) an injection cylinder 71 (FIG. 7) of moulded material connected to the portion 70 by a duct 72 and supplied by a duct 73.

(b) an injection piston 74 sliding in said cylinder 71 and actuated by a double-acting hydraulic servo-motor, the piston 75 of which slides in a cylinder 76 the two chambers of which are connected through a distributor 77 and pipings 78 and 79 alternately to said piping 20 of fluid under pressure and to said exhaust piping 21.

(c) a push rod 49 carried by a piston 80 sliding in a cylinder 81 the two chambers of which are connected through a distributor 84 and pipings 82 and 83 alternately to said piping 20 and to said piping 21. Said push rod 49 passes axially through said pistons 74 and 75 and is adapted to engage the duct 72 so as to push moulded material into the neck 85 of the formed and filled container R.

The station D of ejection of the completed container comprises:

(a) the air compressor 41 which supplies with compressed air the inner cavity of said hollow shaft 36.

(b) an aperture 86 disposed in the wall of said shaft 36 and which communicates for a given angular position of the toothed wheel 34 with a duct 87 carried by each arm 44, 45, 46 and the end of which opens in said cavity 88 of the portion 68 and is normally closed by a valve 89.

The operation of the described installation is as follows:

If the gear 8 and the toothed wheel 34 are in an indifferent relative position (FIG. 2), the injection device 2 of moulded material is in its back or rest position defined by the abutment 25, the filling device 50 is also in its back rest position defined by the abutment 66 and the sealing device 43 itself is also in its back or rest position defined by the abutment 106. Consequently, said gear 8 and said toothed wheel 34 may be driven manually or by means of an actuating device of known type, not shown, up to a relative working position (FIG. 1) for which the guides 7 carried by the support 5 are located in the diametral plane common to the gear 8 and to the toothed wheel 34 and which goes through the shafts 6 and 36. For such a working position, one of the arms 44, 45, 46 is also located in said common diametral plane, as well as the injection device 2 and the filling device 50, while another arm 45 is located in the radial plane passing through the sealing device 43 and the third arm 46 is located in a radial plane passing through the aperture 86.

When the gear 8 and the toothed wheel 34 are in such a working position, the operator can displace the injection device 2, the filling device 50 and the sealing device 43 along their respective rails 37, 67 and 105 up to their working position defined by the abutments 26, 65 and 107.

The moulds $M_1$, $M_2$ and $M_3$ are then maintained by said various devices 2, 50 and 43 in closing position (FIG. 1).

To simplify the following description, it is supposed that for each successive working position of the gear 8 and of the toothed wheel 34—which constitute with the support 5 and the arms 44, 45, 46 two transfer devices— a single operating station is set in function. The two transfer devices being placed in one of their relative positions corresponding to a working position of the installation, the operator actuates the control member of the distributor 19, so as to connect the chamber 16 of the cylinder 14 to the piping 20 of fluid under pressure and to connect simultaneously the chamber 15 of said cylinder 14 to the exhaust piping. The piston 13 is actuated toward the bottom of FIG. 5 and drives in its displacement the injection piston 11. Consequently, material to be moulded, contained in the cylinder 9 supplied by the duct 10, is injected through the duct 90 into the cavity of the mould $M_1$ formed by the portions 3 and 4. It is clear that the cylinder 9 is maintained by a heating device, not shown, constituted for example by an electric heating element, at a defined temperature for which the plastic material is in a state allowing its injection and its forming.

Before this injection, the operator has caused, by actuating the control member of the distributor 31, the engagement of the needle 29 into the filling duct 28. Thus, at the moment of the injection of material to be moulded into the mould $M_1$, said filling duct is completely closed. The volume of the cavity of said mould $M_1$ corresponds to the volume of material to be moulded required for the manufacturing of the desired container.

As soon as said injection of material to be moulded is completed, the operator actuates the control member of the distributor 94 so as to set the piping 95 under pressure and the piping 96 to exhaust. The piston 92 is actuated toward the bottom of FIG. 5 and the push rod engages the duct 90. When the face 97 of the piston 92 abuts on the bottom 98 of the cylinder 93, the end of the push rod 91 is situated at the level of the bottom 99 of the cavity of the mould $M_1$. As shown, the diameter of the push rod 91 corresponds to the diameter of the portion 100 of the duct 90 opening into the cavity of the mould $M_1$.

Said operations being completed, the operator actuates the control members of the distributors 19 and 31 so as to cause the withdrawing of the needle 29 from the filling duct 28 and the return of the injection piston 11 back to its rest position defined by its face 101 abutting on the bottom 102 of the cylinder 9. Then, is moved the injection device 2 back to its rest position defined by the abutment 25. The portion 3 of the mould $M_1$ is driven in the displacements of the injection device 2 along its rails 37. Consequently, the deadhead of material to be moulded injected into the mould $M_1$ remains adherent to the portion 4 of said mould $M_1$ and the separation of said deadhead 103 from the material to be moulded remaining in the feeding duct 90 is made at the level of the bottom 99, as the push rod 91 closes the portion 100 of said duct. It follows that said deadhead 103 comprises practically no "plug."

After having caused the return of the piston 92 to its rest position by actuating the control member of the distributor 94, the operator angularly displaces the gear 8 180° so as to bring the portion 4 of the mould which carries the deadhead 103 opposite the filling device 50. Said displacement of 180° of the gear 8 has caused an angular displacement of 120° of the toothed wheel 34, so that the arm 46 is located in the common diametral plane passing through the shafts 6 and 36 and the mould portion 68 which it carries is located opposite the guide 7 in which is engaged the mould portion 4 carrying the deadhead 103.

The operator displaces then the filling device 50 along its rails 67 up to its working position defined by the abutment 65. During said displacement the conical nose 60 engages the conical inlet 63 of the mould portion 4 carrying the deadhead 103 and pushes said mould portion 4 along its guide 7. In the working position of the filling device, the face 108 of said mould portion 4 is applied on the front face 109 of the mould portion 68 carried by the arm 46. Thus, said two portions 4 and 68 form a mould $M_2$ the cavity of which has the form and the volume of the container to be manufactured.

The operator actuates then the control member of the distributor 58, so as to connect the piping 48 to the piping 20 of fluid under pressure and the piping 47 to the exhaust piping 21. The piston 56 is pushed toward the top of FIG. 6 up to the position shown in said figure. The piston 55 is driven in the displacement of the piston 56 and compresses liquid, contained in the cylinder 52 supplied by the tank 51, through the duct 61 and the filling duct 28 into the cavity of the mould $M_2$ and into the deadhead 103 of plastic material enclosed in said cavity, when said deadhead is still at a temperature for which its material is in a state which allows its forming. According to the dimensions of the deadhead 103 and the temperature required for obtaining said state of the plastic material, one can provide a heating device, such as an electrical heating element, maintaining the mould $M_2$ at the required temperature.

Said liquid injected into the deadhead 103 makes a cavity inside said deadhead, so that said material to be moulded takes the exact shape of the walls of the cavity of the mould $M_2$ as illustrated in FIG. 6. Thus, a container R is formed and filled up with liquid by one and the same operation.

In the illustrated embodiment of the installation, the cavity of the mould $M_2$ has the outside form of a pharmaceutic phial and the tank 51 contains a serum or other fluid pharmaceutic preparation, so that the pharmaceutic phial R is manufactured by injection into the deadhead 103 of the liquid provided for the filling up of said pharmaceutic phial. However, in another embodiment, the tank 51 could contain another product fluid, semi-fluid or pasty intended to be put in phials, flasks or other containers allowing its packing and set up for sale.

Said operation of container formation and filling being completed, then is moved the filling device 50 back to its rest position defined by the abutment 66. A spring not shown pushes the mould portion 4 along its guide up to the position illustrated on FIG. 2 and defined by an abutment not shown. During said displacement of the mould portion 4, the filling duct 28, carried by said mould portion, is completely pulled out of the formed container R, so that an empty space is formed in the top part of said container. The volume of said empty space corresponds to the volume of the portion of the walls of said filling duct which was located inside said container R.

The operator actuates then the control member of the distributor 58 so as to reverse the supply and the setting to exhaust of the chambers of variable volume delimited inside the cylinder 57 by the piston 56 and to cause thus the return of the pistons 55 and 56 back to their rest position.

The operator actuates again the toothed wheel 34 and displaces said wheel through an angle of 120°, so that the arm 46 which carries the mould portion 68 provided with the container R filled up with liquid places itself opposite the sealing device 43. At this moment, he displaces said device along its rails 105 up to its working position defined by the abutment 107 and for which the front face 111 of the mould portion 70 bears on the front face 109 of the portion 68 carrying the filled container R. Said portion 70 forms then with the portion 68 a mould $M_3$.

The operator can then proceed with the sealing of the neck 85 of the container R. To this effect, he actuates the control member of the distributor 77, to supply the piping 79 with fluid under pressure and to set to exhaust the piping 78. The piston 75 is then displaced toward the top of FIG. 7 and drives in its displacement the piston 74 which pushes material to be moulded contained in the cylinder 71 supplied by the duct 73 through a duct 72 up into the neck 85. Then, the operator actuates the control member of the distributor 84 to supply the piping 83 with fluid under pressure and to set the piping 82 to exhaust. The piston 80 is actuated toward the top of FIG. 7 and the end of its push rod 49 pushes the cylinder of material to be moulded, contained in the portion 112 of the duct 72, in the direction of the neck 85 and forces said cylinder into said neck, so as to close the container in an absolute tight manner. It is clear that here too a heating device not shown, such as for example an electrical heating element, maintains the cylinder 71 and the duct 72 at a temperature for which the plastic material can be set into shape.

Said operation being completed, the sealing device 43 is moved back to its rest position defined by the abutment 106, then the toothed wheel is angularly displaced 120 to bring the duct 87, located in the radial plane containing the arm 46, opposite the aperture 86. At this moment, air under pressure compressed by the compressor 41 enters said duct 87 and exerts a thrust on the valve 89, which causes the opening of said valve. Compressed air enters the cavity 88 and ejects the container R out of said cavity.

Although, for the sake of clearness of the description, the four following operations:

(1) injection of the deadhead 103 into the mould $M_1$,
(2) formation and filling of the container R inside the mould $M_2$,
(3) sealing of said container R placed in the mould $M_3$
(4) ejection of said container R out of the cavity 88 of the mould portion 68 have been described in their successive operation order, the examination of the accompanying drawings shows clearly that these four operations are effectuated simultaneously each in one of the four operating stations A, B, C, D, which comprises the installation. Furthermore, the passage of the installation members from one operating station to another, instead of being controlled manually, could be controlled by a control device causing a step by step advance of the toothed wheel 34.

The displacements of the injection device 2, the filling device 50 and the sealing device 43, from their rest position up to their working position and vice-versa, could be controlled by mechanical, electrical or pneumatic control devices. To avoid wrong operations and needless time losses, it is advantageous to provide for a locking device fixing the toothed wheel 34 and the gear 8 in their various working positions.

An embodiment of the installation for carrying out the process, object of the invention, has been described here by way of example, but it goes without saying that multiple variations can be foreseen without departing from the scope of the claimed protection. Thus, for example, the injection device 2, the filling device 50 and the sealing device 43, instead of being disposed radially opposite the periphery of the gear 8 and of the toothed wheel 34, could be disposed, as well as the guides 7, parallelly to the shafts 6 and 36. Said guides 7 would be then formed inside the gear 8 or a disc fast with said gear. Similarly, the mould portions 68 would be carried by the gear 8 or a disc fast with said gear and their axis would be parallel to the hollow shaft 36. On the contrary, the injection device, the filling device and the sealing device, as well as the servomotor 30, would be disposed opposite the opposed faces of the gear 8 and of the toothed wheel 34.

In another embodiment of the described installation, the sealing device could comprise a warming up device of the end of the container neck and either a squeezing device or a stretching device for said end.

In another embodiment of the process, the mass of plastic material into which is injected the liquid could be hollow.

I claim:

1. An apparatus for the manufacture of containers through injection of a fluid to be contained in said container into a mass of plastic material which is in a moldable state comprising a frame, a transfer device, three operating stations, each of said operating stations comprising a mold, each mold having a different shape according to the function it is intended to fulfill and comprising two mold parts, at least one of which is carried by said transfer device and in which said transfer device comprises first and second supports rotatably mounted on said frame, each of said supports carrying at least two of said mold parts carried by said transfer device, mold parts carried by one of said supports having the same shape and mold parts carried by the other of said supports having a different shape, mold parts carried by said first support cooperating successively through rotation of said first support with a linearly displaceable mold part forming a first operating station, a fluid-filling hole provided in said mold parts carried by said first support, plastic injection means for said first operating station comprising an injection hole provided in said linearly displaceable mold part of said first operating station for injecting plastic material in a mold formed by said mold parts of said first operating station, closing means for said first operating station comprising a closing rod intended to close said filling hole of the mold part carried by the first support when cooperating with said linearly displaceable mold part of said first operating station, mold parts carried by said first support cooperating successively through rotation of said first and second supports with the mold parts of said second support to form a second operating station, fluid injection means for said second operating station comprising an injection member for engaging said filling hole of said mold parts carried by said first support when cooperating with one of said mold parts carried by said second support to form and fill a container in the mold formed by said mold parts of said second operating station, mold parts carried by said second support cooperating successively through rotation of said second support with a linearly displaceable mold part of a third operating station, a duct provided in said mold part of said third operating station, sealing means of said third operating station comprising a push rod slidably engageable in said duct provided in said linearly displaceable mold part of said third operating station, whereby said mass of plastic material is carried from the first operating station to the second one by a mold part carried by the first support upon rotation of said first support and is further carried from said second operating station to the third one by a mold part carried by the second support upon its rotation.

2. An apparatus according to claim 9 in which said linearly movable mold part of said first operating station is connected to said plastic injection means, and operating means connected to said plastic injection means to inject plastic material into the mold formed by said mold parts of said first operating station.

3. An apparatus according to claim 2 in which said mold parts of said first support have disposed therein a filling duct, and means operated by said operating means to close said filling duct when said plastic material is being injected into the mold.

4. An apparatus according to claim 9 in which said fluid injection means is mounted adjacent said first support, said fluid injection means having a conical portion which engages a like conical impression in said mold parts on said first support member when said fluid injection means is operated, and means connected to said fluid injection means for operation thereof to inject fluid into the mold of said second operating station to form and fill a container therein from plastic material inserted by said plastic injection means at said first operating station.

5. An apparatus according to claim 9 in which said linearly movable mold part of said third operating station is connected to said sealing means, operating means connected to said sealing means to inject sealing material into an aperture left in the formed and filled container formed at said second operating station, and ejection means to eject the formed, filled and sealed container from the mold part carried by said second support.

6. An apparatus for the manufacture of containers comprising a first operating station consisting of a first mold to receive material for forming said container having first and second parts, a movable injection device containing therein said material for forming said container and having connected thereto said first part of said first mold, said second part of said first mold being mounted on a rotatable support and having a filling duct disposed therein, means for forming said first mold by moving said first and second parts of said first mold into engagement, closing means connected to said second part of said first mold for closing said filling duct, means connected to said injection device for injecting said material into said first mold, disengaging means to disengage said first mold by moving the first part of said first mold out of engagement with said second part of said first mold, moving means to move said second part of said first mold having therein said material for forming a container to a second operating station consisting of a second mold to fill and form said container having a first part mounted on a further rotatable support and said second part of said first mold, means for forming said second mold by moving said second part of said first mold into engagement with said first part of said second mold, a filling device containing therein a substance for filling and forming said container, means connected to said filling device for moving said filling device into engagement with said filling duct of said second part of said first mold and for filling and shaping said container in said second mold, second disengaging means to disengage said second mold by moving said second part of said first mold out of engagement with said first part of said second mold, said moving means operable to move said first part of said second mold having therein said formed and filled container to a third operating station consisting of a third mold to seal said formed and filled container having a first part and said first part of said second mold, said first part of said third mold being connected to a second movable injection device containing therein a sealing medium for sealing said formed and filled container, means for forming said third mold by moving said first part of said third mold into engagement with said first part of said second mold, means connected to said second movable injection device for injecting into an aperture left in said formed and filled container by said filling duct said sealing medium, third disengaging means to disengage said third mold by moving said first part of said third mold out of disengagement with said first part of said second mold, and means ejecting said formed, filled and sealed container from said first part of said second mold.

7. An apparatus according to claim 6 in which said rotatable support has a further second part of said first mold mounted thereon in diametrical relationship to said second part of said first mold, and said closing means and said filling device mounted therebetween.

8. An apparatus according to claim 6 in which said further rotatable support has further first parts of said second mold mounted thereon at predetermined angular relationship so that while one of said first parts of said second mold is in engagement with said second part of said first mold another one of said first parts of said second mold is in engagement with said first part of said third mold.

9. An apparatus for the manufacture of containers through injection of a fluid into a mass of plastic material in a moldable state comprising a frame, a transfer device consisting of first and second supports rotatably mounted on said frame, a first operating station consisting of plastic injection means being mounted on said frame adjacent said first support and said transfer device, a second operating station consisting of fluid injection means being mounted on said frame adjacent one of said supports of said transfer device, a third operating station consisting of sealing means being mounted on said frame adjacent said second support of said transfer device, mold parts having the same configuration and being mounted in equal angular relationship on said first support, further mold parts having the same configuration and being mounted on said second support in equal angular relationship, a linearly movable mold part disposed at each of said operating stations, means at each operating station for moving said movable mold part thereof into engagement with one of said mold parts on said supports to form a mold, each mold formed at each operating station by said movable mold part thereof and one of said mold parts on said supports forming a different configuration, and means to remove said movable mold part from engagement with one of said mold parts on said supports.

References Cited in the file of this patent

UNITED STATES PATENTS

| | | |
|---|---|---|
| 2,127,487 | Voit | Aug. 16, 1938 |
| 2,158,837 | Schukraft | May 16, 1939 |
| 2,205,837 | Ravenscroft et al. | June 25, 1940 |
| 2,296,294 | Scherer | Sept. 22, 1942 |
| 2,387,747 | Cowley | Oct. 30, 1945 |
| 2,618,814 | Paton et al. | Nov. 25, 1952 |
| 2,692,404 | Plourde | Oct. 26, 1954 |
| 2,715,751 | Weber | Aug. 23, 1955 |
| 2,853,736 | Gussoni | Sept. 30, 1958 |
| 2,872,766 | Meissner | Feb. 10, 1959 |

FOREIGN PATENTS

| | | |
|---|---|---|
| 735,378 | Germany | May 13, 1943 |